Patented Apr. 10, 1951

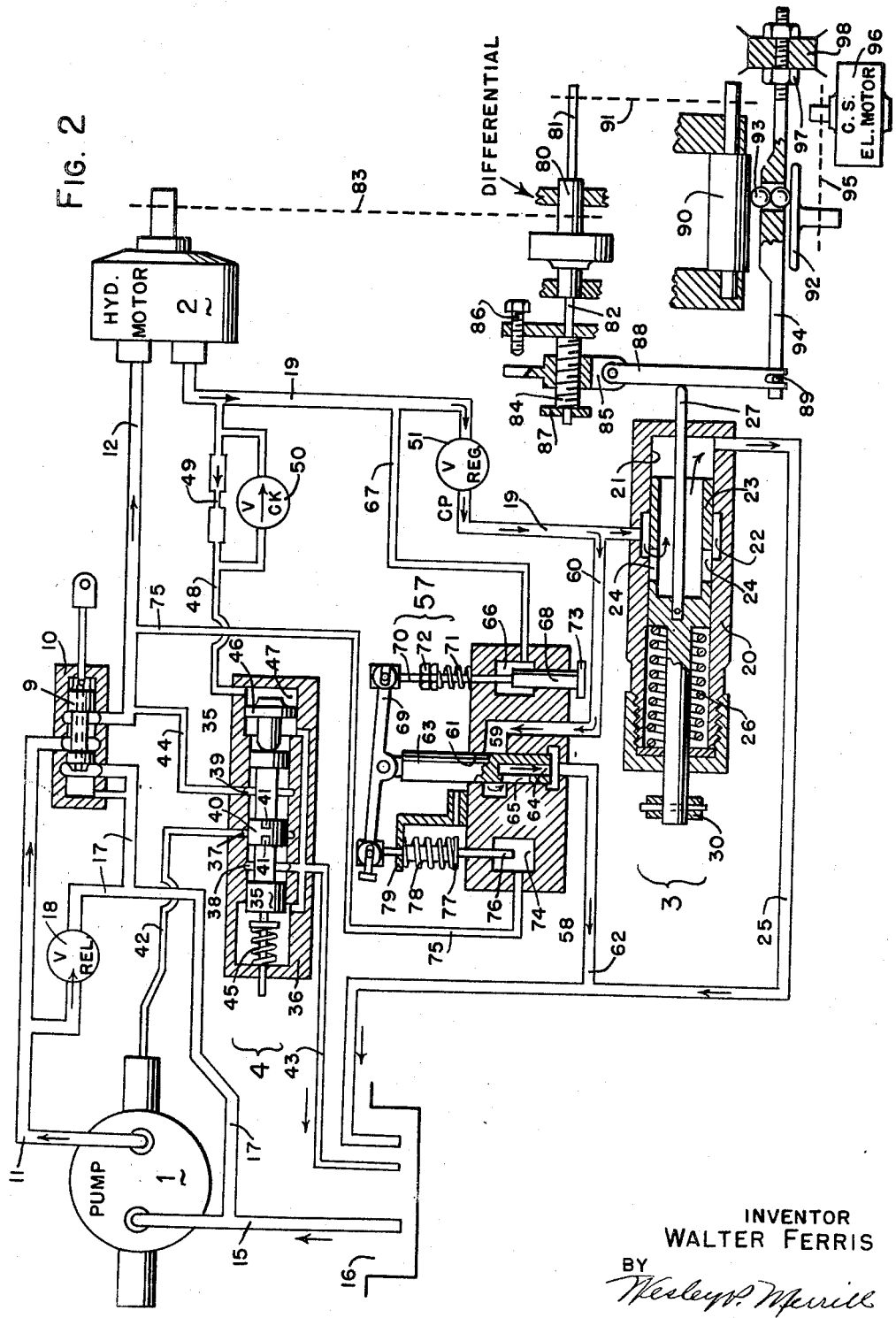

2,548,147

UNITED STATES PATENT OFFICE 2,548,147

HYDRAULIC TRANSMISSION WITH VARIABLE DISPLACEMENT PUMP, THROTTLED OUTFLOW FROM MOTOR, AND LEAKAGE COMPENSATION

Walter Ferris, Milwaukee, Wis., assignor to The Oilgear Company, Milwaukee, Wis., a corporation of Wisconsin Original application April 3, 1947, Serial No. 739,208. Divided and this application May 13, 1949, Serial No. 93,170

19 Claims. (Cl. 60—52)

This application is a division of application Serial No. 739,208 filed April 3, 1947.

The invention relates to hydraulic transmissions of the type which includes a hydraulic motor for driving a load, a pump for supplying motive liquid to the motor to energize it and a choke for throttling the outflow from the motor to thereby control the speed thereof. The pump must be capable of delivering liquid at a rate sufficient to enable the motor to operate at the highest speed that may be required and it must be capable of creating sufficient pressure to enable the motor to start under load and to drive the greatest load to which it may be subjected.

It is common practice to employ in a transmission of the above type a pump having a pressure responsive control which causes the pump to discharge liquid at its full volumetric rate until it is creating a predetermined maximum pressure and which then automatically causes the pump to reduce its displacement until it is delivering just enough liquid to maintain that maximum pressure constant. However, a variation in the load on the motor will cause a variation in the pressure at the inlet of the choke and, since the rate of flow through a choke varies in response to variations in the drop in pressure across the choke, a variation in the load on the motor will cause a variation in the speed of the motor. Also, the pressure created by the pump in excess of the pressure required to enable the motor to drive its load is dissipated at the choke, thereby wasting power and causing the liquid to become heated.

It has heretofore been proposed to provide a transmission in which the motor is energized by liquid supplied thereto by a pump having a hydraulic servo-motor for varying its displacement, the liquid discharged from the motor is passed through a choke which offers only enough resistance to the flow of liquid therethrough to cause creation of a predetermined low pressure at its inlet, and the servo-motor adjusts the displacement of the pump in response to the pressure at the inlet of the choke varying from that predetermined or normal pressure. The motor speed is determined by the adjustment of the pump instead of being determined by the rate at which the motor can discharge liquid through a choke.

When the servo-motor adjusts the pump in response to the pressure at the inlet of the choke varying from normal, it will continue to adjust the pump until the pressure at the inlet of the choke returns to normal at which time the pump will have been over adjusted a small amount which requires that the servo-motor adjust the pump in the opposite direction and amount equal to the over adjustment. Therefore, the motor speed varies somewhat from the desired speed.

The present invention has as an object to provide a transmission in which the motor is supplied with liquid at a pressure at least as great as the pressure required to enable the motor to drive its load, the speed of the motor is controlled by throttling the outflow therefrom, and the speed of the motor is maintained substantially constant.

Another object is to provide a transmission in which the speed of the motor is controlled by passing the outflow from the motor through a choke, the pressure at the inlet of the choke is maintained substantially constant to thereby maintain the motor speed substantially constant, and the pump is automatically adjusted to deliver liquid to the motor at a pressure not much in excess of the pressure required to enable the motor to drive its load at the speed determined by the adjustment of the choke to thereby avoid any substantial loss of power or heating of the liquid.

When a hydrodynamic machine is functioning under load either as a pump or as a motor, it has as an inherent characteristic thereof an amount of leakage which varies in response to variations in the drop in pressure across the machine. This leakage is due to liquid leaking out of the cylinders of the machine, liquid leaking out of the valve which controls the flow of motive liquid to and from the cylinder, liquid passing across the face of that valve from the high pressure port to the low pressure port thereof.

The liquid which passes across the face of the motor valve from the high pressure port to the low pressure port thereof augments the liquid discharged from the motor cylinders and it will be designated herein as the "slip" of the motor. That is, the motor slip is the liquid discharged from the motor outlet in excess of the liquid actually used by the motor in driving its load. Since the drop in pressure across a motor varies in response to variations in the load on the motor, the slip of the motor will vary in response to variations in motor load and thereby cause variations in the rate at which the liquid is delivered to the choke through which the outflow from the motor passes.

Another object of the invention is to provide a hydraulic transmission in which the speed of the motor is regulated by means which throttles the outflow from the motor and the throttling means is automatically adjusted to compensate for variations in the slip of the motor due to variations in motor load.

Another object is to provide a hydraulic transmission in which the speed of the motor is regulated by means which throttles the outflow from the motor and the throttling means is automatically adjusted in response to motor speed varying relatively to the speed of a reference element which may operate at a constant speed or at a variable speed.

Another object is to provide a hydraulic transmission in which the speed of the motor is regulated by means which throttles the outflow from the motor, the pump tends to deliver liquid at a maximum rate until pump pressure reaches a maximum and then it is automatically adjusted until it is delivering just enough liquid to maintain that pressure constant, and the pump is further adjusted in response to variations in the pressure at the motor outlet.

Other objects and advantages will appear from the following description of the embodiments of the invention shown schematically in the accompanying drawings in which the views are as follows:

Fig. 2 is a diagram similar to Fig. 1 but showing the transmission provided with means for maintaining the speed of the motor proportional to a reference speed.

*Figure 1*

Figure 1:
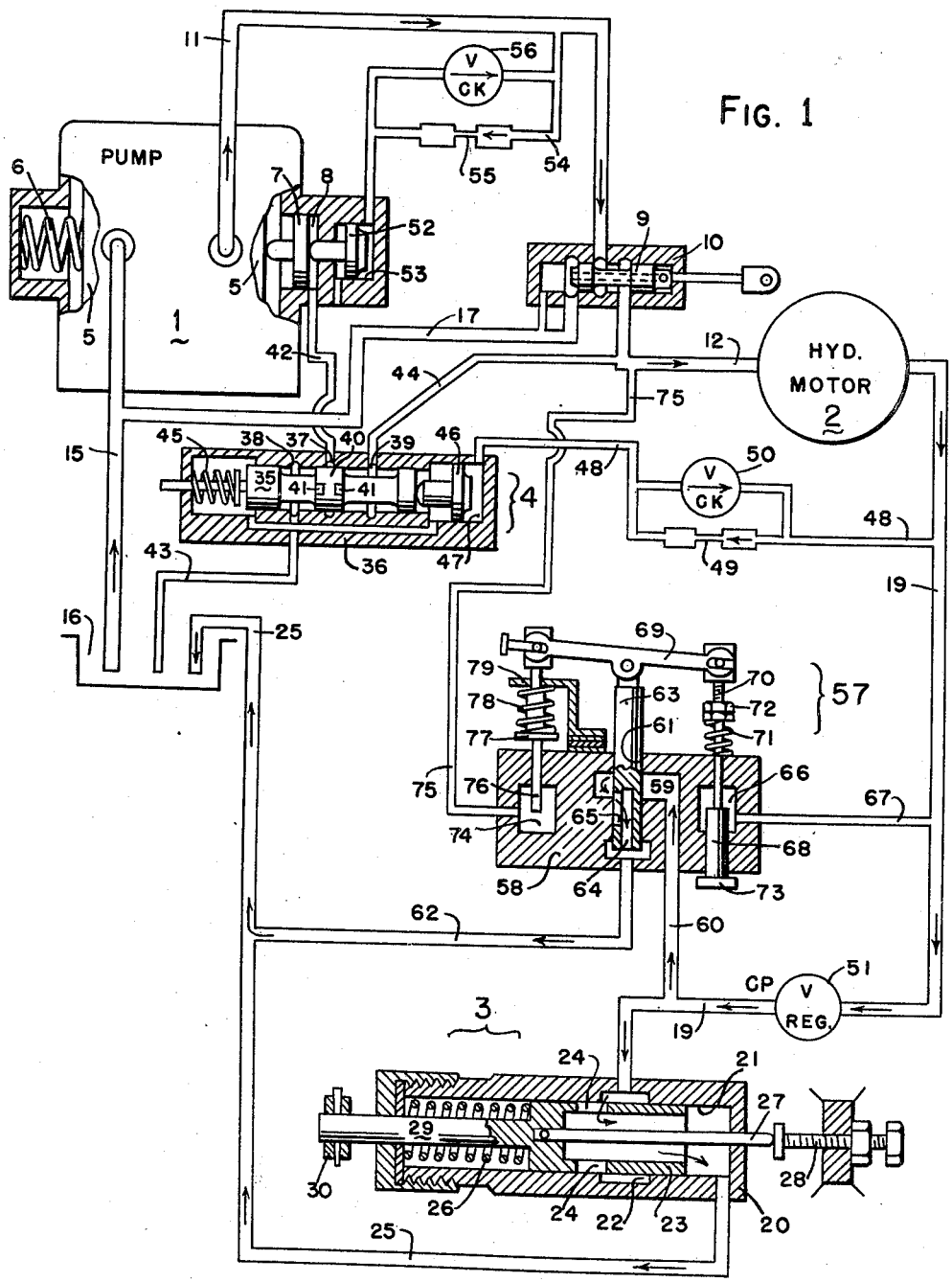
Fig. 1 is a diagram of the hydraulic circuit of a transmission in which the invention is embodied, the parts being shown in the positions occupied when the transmission is operating.

The transmission shown in this figure includes a pump 1, a motor 2 which is energized by liquid delivered thereto by pump 1, a choke or throttle valve 3 connected between the outlet of motor 2 and exhaust, and a control valve 4 which functions to effect adjustment of pump 1 in response to variations in the pressure of the liquid discharged by motor 2.

Pump 1 may be of any suitable type such as a radial piston pump, an axial piston pump, a vane pump or the like but it should have a control which adjusts its displacement.

For the purpose of illustration, pump 1 has been shown as being of the well-known radial piston type and as having a displacement varying member or slide block 5 which is constantly urged toward its maximum displacement position by a predetermined force such as by a spring 6. Pump 1 may be provided with a control including a piston 7 which is fitted in a stationary cylinder 8 and is adapted to move slide block 5 toward its zero displacement position when liquid is supplied to cylinder 8 under the control of valve 4.

The transmission may be started and stopped by starting and stopping pump 1 but for the purpose of illustration it has been shown provided with a start and stop valve having a valve 9 fitted in a valve casing 10 which is connected by a channel 11 to the outlet of pump 1 and is connected by a channel 12 to the inlet of motor 2.

Pump 1 is adapted to draw liquid through a channel 15 from a reservoir 16 and to discharge it into channel 11 which may be connected by valve 9 either to channel 12 or to one end of a channel 17 the other end of which is connected to suction channel 15. When valve 9 is in its right hand position as shown, pump 1 will deliver liquid to motor 2 to energize it and, when valve 9 is shifted to its left hand position, pump 1 will be bypassed through channel 11, valve casing 10 and channels 17 and 15.

The pressure created by pump 1 is limited by a relief valve which is arranged within the casing of pump 1 according to the usual practice. Therefore, the relief valve does not appear in Fig. 1 but, for the purpose of illustration, a relief valve 18 has been shown in Fig. 2 as being separate from pump 1 and as having its inlet connected to channel 11 and its outlet connected to channel 17.

Motor 2 has its outlet connected by a channel 19 to the casing 20 of throttle valve 3. Casing 20 has an axial bore 21 and an annular groove or port 22 formed in the wall of bore 21 and communicating with channel 19. Port 22 is controlled by a hollow valve member or throttle 23 having one or more orifices 24 formed in its side wall and adapted to register with port 22 to a greater or lesser extent so that liquid may flow from channel 19 through port 22, orifices 24 and the interior of throttle 23 into the right end of bore 21 which is connected by a channel 25 to reservoir 16.

Throttle 23 is urged toward the right by a spring 26 and it is adapted to be moved toward the left by means of a rod 27 which is fixed to throttle 23 and extends through the right end of casing 20. Adjustment is made by moving rod 27 in one direction or the other. As shown, rod 27 engages an adjusting screw 28 which may be turned in one direction to move throttle 23 toward the left or it may be turned in the opposite direction to permit spring 26 to move throttle 23 toward the right and thereby vary the effective area of orifices 24. Throttle 23 may be provided with a stem 29 which extends through the left end of casing 20 and carries a gage block 30 so that the distance between the edge of port 22 and the edges of orifices 24 may be determined by measuring the distance between block 30 and a fixed point such as the end of casing 20.

Control valve 4 has been shown as including a valve plunger 35 which is fitted in a valve casing 36 having three annular grooves or ports 37, 38 and 39 formed therein. Port 37 may be of substantial width and the central piston 40 on plunger 35 may be of the same width so that, when plunger 35 is in its central position, port 37 will be blocked but a very slight movement of plunger 35 in one direction or the other will open port 37 to one or the other of ports 38 and 39.

However, port 37 has been shown as being relatively narrow and piston 40 has been shown as having a plurality of grooves 41 extending toward each other from opposite ends thereof and so located that, when valve plunger 35 is in its central position as shown, port 37 will be substantially blocked, a slight movement of plunger 35 in one direction or the other from its central position will cause a slight flow of liquid to or from port 37 and a greater movement of plunger 35 will cause a greater flow.

Port 37 is connected to cylinder 8 by a channel 42, port 38 is connected to reservoir 16 by a channel 43 and port 39 is supplied with motive liquid in any suitable manner such as being connected to channel 12 by a channel 44. The arrangement is such that, when valve plunger 35 is shifted toward the right from its central position, liquid may escape from cylinder 8 through channel 42, valve 4 and channel 43 to reservoir 16 and thereby permit spring 6 to move slide block 5 toward the right to increase the displacement of pump 1 and, when pump 1 is delivering liquid to motor 2 and valve plunger 35 is shifted toward the left, liquid may flow from channel 12 through channel 44, valve 4 and channel 42 to cylinder 8 and cause piston 7 to shift slide block 5 toward the left to decrease the displacement of pump 1.

Valve plunger 35 is urged toward the right by a spring 45 and it is adapted to be moved toward the left by a piston 46 fitted in a cylinder 47 which is arranged upon or formed in the right end of valve casing 36. The right end of cylinder 47 is connected to channel 19 by a channel 48 so that piston 46 is subjected to any pressure prevailing at the outlet of motor 2. When the pressure at the outlet of motor 2 rises to such a value that the force exerted by the liquid upon piston 46 exceeds the force exerted upon plunger 35 by spring 45, piston 46 will move plunger 35 toward the left, and when the pressure at the outlet of motor 2 drops below that value, spring 45 will move plunger 35 toward the right.

If channel 48 were unrestricted, a sudden rise in pressure at the outlet of motor 2 above the given value might cause liquid to flow so rapidly through channel 48 to cylinder 47 that piston 46 would move valve plunger 35 far enough to permit liquid to flow at a rapid rate from channel 12 into cylinder 8 and cause piston 7 to move slide block 5 far enough toward the left to reduce pump displacement too much which would result in a drop in pressure which then would cause slide block 5 to again move toward the right. Slide block 5 might be shifted several times before it stopped in its correct position.

In order to reduce the possibility that slide block 5 might oscillate or hunt, the flow from channel 19 to cylinder 47 is restricted such as by inserting a choke 49 in channel 48. However, it is desirable that the displacement of pump 1 be increased rapidly when necessary. Therefore, means are provided for permitting free flow from cylinder 47 to channel 19 such as by connecting a check valve 50 in parallel with choke 49.

Since the flow through an orifice varies with the drop in pressure thereacross and since the pressure at the outlet of a motor varies in response to variations in mechanical load on the motor, the control mechanism thus far described would be incapable of maintaining the speed of motor 2 within a close range. Therefore, a constant pressure valve 51 is inserted into channel 19 between throttle valve 3 and channel 48 so that piston 46 is subjected to the varying pressure at the outlet of motor 2 but the drop in pressure across valve 3 is maintained substantially constant for the reason that the pressure at the outlet of valve 3 is constant and valve 51 maintains the pressure at the inlet of valve 3 substantially constant.

When pump 1 is running and valve 9 is in its left hand position, pump 1 is bypassed, motor 2 is idle and therefore is not creating pressure in channel 19, spring 45 is holding valve plunger 35 in its right hand position, and spring 6 is holding pump 1 on full stroke as explained above. Then when valve 9 is shifted to its right hand position as shown, pump 1 will attempt to deliver liquid at its full volumetric rate to motor 2 but motor 2 cannot instantly start its load. Therefore, pump pressure will rise to maximum and, if no other means were provided, all of the liquid discharged by pump 1 in excess of the liquid which can enter motor 2 would be exhausted through the pump relief valve, such as the valve 18 shown in Fig. 2, until motor 2 reached the desired speed and the back pressure thereon effected a reduction in pump displacement.

In order to avoid the discharge of liquid through the pump relief valve and the resultant loss of power and heating of the liquid, pump 1 may be provided with a control which will reduce pump displacement in response to pump pressure exceeding a given maximum.

The pressure responsive control may be of any suitable type, such as that shown in Patent No. 2,080,810, but for the purpose of illustration it has been indicated schematically as having a piston 52 fitted in a cylinder 53 which is connected to channel 11 by a channel 54 having a choke 55 inserted therein to limit the rate of flow from channel 11 to cylinder 53, a check valve 56 being connected in parallel with choke 55 to permit free flow from cylinder 53 to channel 11.

Servo-motor 52—53 has been shown arranged outward from servo-motor 7—8 with the stem of its piston 52 adapted to engage piston 7 which has its stem in contact with slide block 5 but the positions of the two servo-motors may be reversed. Also, servo-motor 52—53 may be omitted and valve 4 replaced by a valve which controls the flow of liquid to and from servo-motor 7—8 and which is urged in one direction by a substantially constant force, such as the spring 45 of valve 4, and is urged in the opposite direction by both the pump pressure and the pressure at the outlet of motor 2.

In the transmission as shown, pump displacement is maximum when valve 9 is in its left hand position. When valve 9 is shifted into its right hand position, pump 1 will attempt to deliver liquid at its full volumetric rate to motor 2 but, since motor 2 cannot start its load instantaneously, pump pressure will rise to maximum and liquid will flow from channel 11 through channel 54 to cylinder 53 and cause piston 52 to shift slide block 5 toward the left far enough to reduce pump displacement to such a value that pump 1 will deliver only enough liquid to maintain that maximum pressure constant until motor 2 has been accelerated to such a speed that it is discharging liquid fast enough to create sufficient back pressure in channel 48 to enable piston 46 to shift valve plunger 35. Thereafter, the displacement of pump 1 will be controlled jointly by back pressure acting on piston 7 and by pump pressure acting on piston 52.

Compensation for variations in the slip of the motor may be made by varying the effective area of orifices 24 in throttle valve 3 in response to variations in the drop in pressure across the motor but the transmission has been shown provided with a separate choke or slip compensator 57 which is connected in parallel with throttle valve 3 and is adjusted in response to variations in the drop of pressure across the motor.

The slip compensator may take various forms but for the purpose of illustration it has been shown as including a body 58 having an inlet chamber 59 formed therein and connected by a channel 60 to channel 19 at a point between throttle valve 3 and constant pressure valve 51. Chamber 59 intersects a bore 61 which is formed in body 58 and communicates at its lower end with a discharge channel 62 shown as being connected to discharge channel 25. A throttle 63 is closely fitted in bore 61 and has an axial bore 64 extending inward from its lower end into communication with one or more orifices 65 formed in the wall of bore 64 and adapted to register to a greater or lesser extent with chamber 59 when the slip compensator is functioning.

Body 58 also has provided therein a back pressure chamber 66 which is connected to the outlet of the motor to be controlled such as by being connected by a channel 67 to channel 19 at a point between motor 2 and constant pressure valve 51. A plunger 68 is closely fitted in the lower part of body 58 and extends into chamber 66 so that its upper end is subjected to any pressure prevailing in chamber 66.

Plunger 68 is adapted to transmit motion to a lever 69 which is pivoted intermediate its ends upon the upper end of throttle 63. Preferably, one end of lever 69 is connected to the lower end of plunger 68 by a yoke which extends around body 58 but for the purpose of illustration plunger 68 has been shown as being connected to one end of lever 69 by a rod 70 and as being urged upward by a spring 71 which encircles rod 70 between the top of body 58 and adjusting nuts 72 which are threaded upon rod 70, upward movement of plunger 68 being limited by a stop 73 arranged upon its lower end.

Body 58 also has formed therein a high pressure chamber 74 which is connected to the inlet of the motor to be controlled such as by being connected to channel 12 by a channel 75. Closely fitted in the upper part of body 58 is a plunger 76 which extends into chamber 74 and is connected at its upper end to the other end of lever 69. Plunger 76 has a stop 77 fixed to or formed upon the intermediate portion thereof and it is urged downward by a spring 78 arranged between stop 77 and an abutment 79 which is fastened to body 58.

When there is no back pressure in chamber 66 and there is no pump pressure in chamber 74, springs 71 and 78 are full extended, stops 73 and 77 engage body 58, the right hand end of lever 69 is in its highest position, the left hand end of lever 69 is in its lowest position and the top edges of orifices 65 are flush with the bottom wall of inlet chamber 59 so that no liquid can flow from inlet channel 60 into exhaust channel 62.

When there is pump pressure in chamber 74 but no back pressure in chamber 66, the pump pressure will cause plunger 76 to raise the left end of lever 69 and thereby raise throttle 63 which will open orifice 65 an amount proportional to the pump pressure. Then when back pressure is created in chamber 66, it will cause plunger 68 to move the right end of lever 69 downward and thereby lower throttle 63 which will reduce the orifice opening by an amount proportional to the back pressure. The resultant orifice opening is thus proportional to the drop in pressure across the motor.

Upward movement of either one of the two plungers 68 and 76 without a corresponding downward movement of the other one of the two plungers will cause lever 69 to raise throttle 63 and thereby increase the effective area of orifices 65. That is, a greater area of orifices 65 will register with chamber 59. Conversely, downward movement of either one of the two plungers 68 and 76 without a corresponding upward movement of the other one of the two plungers will cause lever 69 to lower throttle 63 and thereby decrease the effective area of orifices 65.

When the motor is driving a substantial load, the inlet pressure will be high enough to have raised plunger 76 part away to the limit of its movement, the back pressure or outlet pressure will be high enough to have moved plunger 68 downward a short distance and the relative positions of the two plungers will be such that lever 69 will have raised throttle 63 to uncover a part of the area of orifices 65. Springs 71 and 78 are so calibrated that the positions of plungers 68 and 76 will be such that the effective area of orifices 65 will be just large enough to permit liquid to flow therethrough at a rate approximately equal to the slip of the motor. Thereafter a variation in the load upon the motor will cause a variation in the drop in pressure across the motor which will cause plunger 76 and/or plunger 68 to readjust throttle 63 in accordance with the variation in motor slip due to the variation in motor load.

*Operation*

The transmission may or may not include means to compensate for variations in motor slip, such as slip compensator 57, and pump 1 may be provided either with a control which is responsive to pump pressure, or with a control which is responsive to the pressure at the outlet of motor 2 or with a control which is responsive to both of those pressures. Assuming at first that slip compensator 57 is omitted, the transmission will operate as follows:

When pump 1 is running and valve 9 is in its left hand position, pump 1 will be at its maximum displacement and will draw liquid through channel 15 from reservoir 16 and discharge it into channel 11. The liquid discharged by pump 1 will flow through channel 11, valve casing 10 and channels 17 and 15 back to the inlet of pump 1. Valve plunger 35 of control valve 4 will be held by spring 45 at the limit of its movement toward the right due to the lack of any pressure in channel 19.

When valve 9 is shifted to the position shown in Fig. 1, the liquid discharged by pump 1 will flow through channel 11, valve casing 10 and channel 12 to motor 2 and cause it to start to operate and to discharge liquid through channel 19, throttle valve 3 and channel 25 to reservoir 16. Since motor 2 cannot instantly accelerate its load to full speed, pump pressure will rise to maximum and, if pump 1 is not provided with a control which is responsive to pump pressure such as control 52—56, pump 1 will continue to discharge liquid at its full volumetric rate and the liquid discharged by it in excess of the liquid required by motor 2 will be exhausted through relief valve 18 and channels 17 and 15 back to the inlet of the pump.

If pump 1 is provided with a control which is responsive to pump pressure, it will automatically reduce its displacement until it is delivering just enough liquid to maintain that maximum pressure constant. That is, the volumetric delivery of pump 1 will be reduced to a very low rate until after motor 2 has been started and then the delivery rate will gradually increase as motor 2 accelerates but pump pressure will be maintained at maximum.

Motor 2 will gradually accelerate and it will discharge liquid at a gradually increasing rate. Orifices 24 in throttle valve 3 are so proportioned that, at any adjusted motor speed, the entire discharge from motor 2 will flow through throttle valve 3 at a predetermined low pressure, such as 25 p. s. i. so that throttle valve 3 will at first offer but little resistance to the flow of liquid therethrough but its resistance will gradually increase as the flow therethrough increases and this increasing resistance will cause the pressure at the inlet of throttle valve 3 to rise until it reaches the predetermined low pressure such as 25 p. s. i.

Since at this time pump 1 is discharging liquid at a rate great enough to maintain pump pressure maximum, motor 2 will tend to run faster than the speed determined by throttle valve 3 and it will tend to discharge liquid faster than the liquid can flow through throttle valve 3 at the predetermined low pressure, thereby causing the pressure in channel 19 to rise and effect operation of constant pressure valve 51 which then will function to maintain the pressure at the inlet of throttle valve 3 substantially at the predetermined low pressure so that the rate of flow through throttle valve 3 is maintained substantially constant and, consequently, the speed of motor 2 is maintained constant.

If pump 1 is provided with a control which is responsive only to pump pressure, pump 1 will automatically reduce its rate of delivery to the rate required by motor 2 but it will maintain pump pressure approximately at maximum. Since the pressure required to enable motor 2 to drive its normal load is less than that maximum, motor 2 after being accelerated to the speed determined by throttle valve 3 will tend to run still faster and tend to discharge liquid faster than the liquid can flow through throttle valve 3, thereby causing creation of a back pressure on motor 2 which is substantially equal to the difference between the maximum pump pressure and the pressure required to enable motor 2 to drive the mechanical load thereon. The energy in the liquid under back pressure is translated into heat at valves 51 and 3 but the power loss and the heating of the liquid are much less than would be the case if the pressure responsive control were not provided and the excess pump delivery were exhausted through the pump relief valve.

If pump 1 is provided with a control which is responsive to the back pressure on motor 2, such as control valve 4 and servo-motor 7—8, creation of a predetermined low back pressure on motor 2 will cause the displacement of pump 1 to be reduced until pump 1 is delivering liquid at a rate and a pressure but little if any greater than the rate and pressure required to enable motor 2 to drive its load at the speed determined by throttle valve 3 and thereafter a variation in back pressure, due either to an adjustment of valve 3 or to a variation in the load on motor 2, will cause pump 1 to be further adjusted.

If the variation in back pressure is due to valve 3 being adjusted to effect an increase or a decrease in the speed of motor 2, pump 1 will be adjusted to correspondingly increase or decrease its rate of delivery and thereby enable motor 2 to operate at the speed determined by the adjustment of valve 3. If the variation in back pressure is due to a variation in the load on motor 2, pump 1 will be adjusted to vary its rate of delivery enough to vary pump pressure an amount equal to the variation in back pressure to thereby compensate for the variation in motor load.

For example, when motor 2 has been accelerated to the speed determined by throttle valve 3 and the back pressure on motor 2 has reached a predetermined low value as determined by the resistance of spring 45, such as 40 p. s. i., liquid will flow through channel 48 to cylinder 47 and cause piston 46 to move valve plunger 35 into its neutral position.

Since at this time pump pressure is considerably higher than the pressure required to enable motor 2 to drive its load, the back pressure will increase and enable piston 46 to move valve plunger 35 far enough to open port 37 to port 39, only a slight increase in back pressure being required.

Opening port 37 to port 39 permits liquid to flow from channel 12 through channel 44, valve 4 and channel 42 to cylinder 8 and cause piston 7 to shift slide block 5 toward the left until pump pressure has been reduced enough to cause the back pressure to drop substantially to the predetermined low value and thereby permit spring 45 to move valve plunger 35 toward the right until port 37 is open to port 39 only enough to enable the pressure in channels 12 and 44 to maintain in cylinder 8 just enough pressure to enable piston 7 to hold slide block 5 in its adjusted position against the thrust of spring 6.

Thereafter, if throttle valve 3 is adjusted to decrease the effective area of orifices 24, the speed of motor 2 will be decreased and the back pressure on motor 2 will be increased for the reason that the rate at which liquid can flow through valve 3 is decreased. The increase in back pressure causes pump 1 to reduce its displacement until it is delivering liquid at the rate required to enable motor 2 to operate at the speed determined by the adjustment of valve 3 as previously explained. When pump delivery has been reduced to the rate required by motor 2, the back pressure will have dropped to normal.

Conversely, if throttle valve 3 is adjusted to increase the effective area of orifices 24 to thereby effect an increase in the speed of motor 2, the back pressure will drop and permit spring 45 to move valve plunger 35 far enough toward the right to open port 37 to port 38 so that liquid can escape from cylinder 7 through channel 42, valve 4 and channel 43 into reservoir 16 and spring 6 can move slide block 5 toward the right to increase the rate of pump delivery and thereby increase the speed of motor 2. Slide block 5 will move toward the right until pump 1 is delivering liquid at the rate required to enable motor 2 to operate at the speed determined by the adjustment of valve 3.

As motor 2 accelerates, it will discharge liquid at an increasing rate and thereby cause the back pressure to rise until motor 2 has reached the speed determined by valve 3 at which time the back pressure will have risen to normal and will have caused piston 46 to have moved valve plunger 35 far enough toward the left to enable servomotor 7—8 to hold slide block 5 in its newly adjusted position.

It has previously been explained that a variation in motor load will cause a variation in pump pressure and a resultant variation in the leakage of the system. If the load on motor 2 should decrease, motor 2 would tend to run faster than the speed determined by the adjustment of throttle valve 3 and it would tend to discharge liquid at an increased rate but this tendency would be resisted by throttle valve 3 and constant pressure valve 51 which would cause the back pressure to rise and shift piston 46 and valve plunger 35 toward the left to effect enough reduction in the displacement of pump 1 to compensate for the reduction in leakage resulting from the reduction in motor load.

Conversely, if the load on motor 2 should increase, motor 10 would tend to run slower than the speed determined by the adjustment of throttle valve 3 and it would tend to discharge liquid at reduced rate which would cause the back pressure to drop and permit spring 45 to move valve plunger 35 toward the right to effect enough increase in the displacement of pump 1 to compensate for the increase in leakage resulting from the increase in motor load.

Pump 1 thus delivers only enough liquid to enable motor 2 to operate at the speed determined by the adjustment of throttle valve 3 and it creates sufficient pressure to enable motor 2 to drive its load and to maintain the predetermined low back pressure on motor 2.

It has previously been explained that the drop in pressure across a motor varies in response to variations in the load on the motor and that the slip of the motor varies in response to variations in the drop in pressure. Therefore, at any given motor speed the rate at which the motor discharges liquid will vary in response to a variation in motor load. Since the flow through throttle valve 3 is substantially constant due to valve 51 maintaining a substantially constant pressure at the inlet of valve 3, an increase or a decrease in the rate of motor discharge resulting from an increase or a decrease in motor slip will cause a variation in motor speed unless the effective area of the orifices through which the motor discharge passes is adjusted to compensate for the increase or the decrease in the rate of motor discharge.

The effective area of orifices 24 may be adjusted by adjusting throttle valve 3 in response to variations in the drop in pressure across the motor to thereby compensate for variations in motor slip but, since valve 3 must be large enough to pass the entire motor discharge and since the motor slip is a very small part of the total motor discharge, it has been found to be advantageous to provide a separate slip compensator 57 as it may be relatively small.

Slip compensator 57 functions in the above described manner to bypass liquid around throttle valve 3 at a rate substantially equal to the rate of the motor slip and to maintain that rate substantially equal to the rate of motor slip regardless of variations in motor load so that the liquid flowing through throttle valve 3 is substantially equal to the liquid used by the motor in driving its load, thereby enabling the throttle valve 3 to maintain the motor speed substantially constant regardless of variations in motor load.

*Figure 2*

In this figure, throttle valve 3 has been shown as being adjusted in response to the speed of motor 2 varying relatively to a reference speed instead of having only a manual adjustment as shown in Fig. 1. Pump 1 has been shown schematically in order to avoid complicating the view but it may be provided with only a pressure responsive control such as the control 52—56 shown in Fig. 1, or it may be provided with only a control which responds to variations in the pressure at the outlet of the motor such as the servo-motor 7—8 and the control valve 4 shown in Fig. 1, or it may be provided with a control which is responsive both to pump pressure and to the pressure at the outlet of motor 2. Since the transmission is otherwise unchanged from the form shown in Fig. 1, like parts have been indicated by like reference numerals and further description thereof will not be given.

As shown, the speed of motor 2 is compared with a reference speed through a differential having three legs 80, 81 and 82. The differential, which may be of the type shown in Fig. 4 of Patent No. 2,222,144, has its first leg 80 driven by motor 2 at a speed proportional to the speed thereof as by means of a suitable drive 83 and its second leg 81 driven at a reference speed so that its third leg 82 rotates in one direction or the other in response to the motor speed varying relatively to the reference speed.

Throttle valve 3 is adjustable in any suitable manner in response to rotation of leg 82. As shown, leg 82 is adapted to rotate a screw 84 having a nut 85 threaded thereon and restrained from rotation in any suitable manner so that rotation of screw 84 in one direction or the other will cause nut 85 to move axially in one direction or the other, axial movement of nut 85 being limited by two stops 86 and 87. Adjustment of throttle valve 3 in response to movement of nut 85 is effected by means of a lever 88 which engages the control rod 27 of throttle valve 3 and has one of its ends pivoted to nut 85 and its other end pivoted upon a normally stationary pin 89.

In order that the motor speed may be adjusted, means may be provided to regulate the speed at which leg 81 of the differential is driven. As shown, leg 81 is driven from a power source through a friction transmission having a cylinder 90 which is connected to leg 81 by a suitable drive 91, a friction disk 92 which is driven at a reference speed, two balls 93 which transmit motion from disk 92 to cylinder 90, and an adjusting member 94 which retains balls 93 in adjusted positions and also carries the pin 89 upon which lever 88 is pivoted.

Disk 92 may be driven at any desired speed which may be constant or variable. As shown, disk 92 is driven through a suitable drive 95 from a constant speed electric motor 96. Adjusting means 94 may be moved to and held in adjusted position in any suitable manner but for the purpose of illustration it has been shown as being adjusted by means of a nut 97 which is threaded upon one end portion of member 94 and is held against a stationary abutment 98 by the thrust of the spring 26 in throttle valve 3.

The arrangement is such that, if balls 93 were on the axis of disk 92, no motion would be transmitted from disk 92 to cylinder 90, but when disk 92 is rotated and balls 93 are offset from the axis of disk 92, cylinder 90 will be driven through balls 93 from disk 92 and it will drive leg 81 of the differential through drive 91 at a speed determined by the speed of disk 92 and the distance balls 93 are offset from the axis of disk 92.

The transmission will operate in the previously described manner except that a variation in the speed of motor 2 relatively to the reference speed will cause the differential to adjust throttle valve 3 which will vary the resistance to the discharge of liquid by motor 2 and thereby correct the variation in motor speed.

More specifically, an increase in motor speed above the correct speed as determined by the adjustment of member 94 will cause drive 83 to increase the speed of leg 80 of the differential relatively to the speed of leg 81 and thereby cause leg 82 to rotate. Leg 82 will rotate screw 84 which will move nut 85 and the upper end of lever 88 toward the left. Lever 88 through rod 27 will move throttle 23 toward the left to decrease the effective area of orifices 24 and thereby reduce the motor speed until motor 2 is operating at the correct speed. Conversely, a decrease in motor speed below the correct speed as determined by the adjustment of member 94 will cause drive 83 to decrease the speed of leg 80 of the differential relatively to speed of leg 81 and thereby cause leg 82 to rotate. Leg 82 will rotate screw 84 which will move nut 85 and the upper end of lever 88 toward the right. Moving lever 88 toward the right will permit spring 26 to move throttle 23 toward the right to increase the effective area of orifices 24 and thereby permit the motor speed to increase until motor 2 is operating at the correct speed.

Throttle valve 3, slip compensator 57, constant pressure valve 51 and the differential thus constitute a speed control which maintains the speed of motor 2 proportional to a reference speed. However, if motor 2 is to operate only at a given speed which may be either constant or varying, friction transmission 90—94 and its drive 95—96 may be omitted, pin 89 may be fixed in a stationary position and leg 81 of differential may be driven at a given speed which may be constant or varying.

Also, slip compensator 57 may be omitted as the differential will adjust throttle valve 3 to compensate for variations in motor slip due to variations in motor load but a slight interval of time is required for the differential to make such correction while slip compensator 57 responds substantially instantaneously to make the correction. Therefore, the slip compensator should be incorporated in the speed control when prompt response is desired.

The invention herein set forth may be modified in various other ways without departing from the scope thereof which is hereby claimed as follows:

1. A hydraulic transmission, comprising a pump having hydraulic means for varying its displacement, a motor energized by liquid delivered thereto by said pump, means for controlling the speed of said motor including a choke for resisting the discharge of liquid from said motor, a constant pressure valve connected between said motor and said choke to maintain a substantially constant pressure at the inlet of said choke, means for supplying motive liquid to said displacement varying means including a control valve having hydraulic actuating means, and channel means connecting said actuating means to the outlet of said motor to cause said actuating means to shift said control valve in response to variations in the pressure of the liquid discharged by said motor.

2. A hydraulic transmission, comprising a pump, a motor energized by liquid delivered thereto by said pump, means for controlling the speed of said motor including a choke for resisting the discharge of liquid from said motor and means for compensating for variations in the slip of said motor due to variations in motor load, and means responsive to the pressure at the outlet of said motor for limiting the rate of delivery of liquid to said motor to the rate required by said motor.

3. A hydraulic transmission, comprising a pump, a motor energized by liquid delivered thereto by said pump, means for controlling the speed of said motor, and means for limiting the rate of delivery of liquid to said motor to the rate required by said motor to enable it to operate at the speed determined by said speed control means, said speed control means including a choke, a channel connecting the outlet of said motor to the inlet of said choke, means for compensating for variations in the slip of said motor due to variations in motor load, and a constant pressure valve arranged in said channel to maintain a substantially constant pressure at the inlets of said choke and said slip compensating means.

4. A hydraulic transmission, comprising a pump, a motor energized by liquid delivered thereto by said pump, means for controlling the speed of said motor, and means for limiting the rate of delivery of liquid to said motor to the rate required by said motor to enable it to operate at the speed determined by said speed control means, said speed control means including means for choking the outflow from said motor to thereby control the speed of said motor and means responsive to variations in the drop in pressure across said motor for adjusting said choking means to thereby compensate for variations in the slip of said motor due to variations in motor load.

5. A hydraulic transmission, comprising a pump having means responsive to pump pressure reaching a given maximum for reducing its displacement until it is delivering just enough liquid to maintain that pressure substantially constant, a motor energized by liquid delivered thereto by said pump, means for controlling the speed of said motor, and means for further reducing the displacement of said pump in response to the discharge from said motor tending to exceed a predetermined rate.

6. A hydraulic transmission, comprising a pump having means responsive to pump pressure reaching a given maximum for reducing its displacement until it is delivering just enough liquid to maintain that pressure substantially constant, a motor energized by liquid delivered thereto by said pump, and means for controlling the speed of said motor including a choke for resisting the discharge of liquid from said motor and means responsive to variations in the drop in pressure across said motor for compensating for variations in the slip of said motor due to variations in motor load.

7. A hydraulic transmission, comprising a pump having means for varying its displacement, a motor energized by liquid delivered thereto by said pump, means for choking the outflow from said motor to thereby control the speed of said motor, means responsive to variations in the pressure of the liquid discharged by said motor relative to the pressure of the liquid delivered to said motor for adjusting said choking means to thereby compensate for variations in the slip of said motor due to variations in motor load, and means for effecting operation of said displacement varying means in response to variations in the pressure of the liquid discharged by said motor.

8. A hydraulic transmission, comprising a pump, a motor energized by liquid delivered thereto by said pump, means for controlling the speed of said motor including choking means for resisting the discharge of liquid from said motor, a constant pressure valve for limiting the pressure of the liquid delivered to said choking means to a substantially constant low pressure, means for adjusting said choking means in response to motor speed varying from a given speed, a separate choke connected in parallel with said choking means, and means responsive to variations in the drop in pressure across said motor for adjusting said choke to thereby compensate for variations in the slip of said motor due to variations in motor load.

9. A hydraulic transmission, comprising a pump, a motor energized by liquid delivered thereto by said pump, means for controlling the speed of said motor including a choke for resisting the discharge of liquid from said motor, means for limiting the rate of delivery of liquid by said pump to the rate required by said motor to enable it to operate at the speed determined by said speed control means, means for adjusting said choke including a differential having one leg thereof driven from said motor and a second leg thereof driven at a reference speed whereby the third leg thereof rotates in response to the speed of said motor varying relatively to said reference speed, means responsive to rotation of said third leg for adjusting said choke, a second choke connected in parallel with said first mentioned choke, and means responsive to variations in the drop in pressure across said motor for adjusting said second choke to thereby compensate for variations in the slip of said motor due to variations in motor load.

10. A hydraulic transmission, comprising a pump having means for varying its displacement, a motor energized by liquid delivered thereto by said pump, means for controlling the speed of said motor including a choke for resisting the discharge of liquid from said motor and means for adjusting said choke in response to motor speed varying from a given speed, said choke causing back pressure at the outlet of said motor, and means for effecting operation of said displacement varying means in response to variations in the pressure at the outlet of said motor.

11. A hydraulic transmission, comprising a pump having means for varying its displacement, a motor energized by liquid delivered thereto by said pump, means for controlling the speed of said motor including a choke for resisting the discharge of liquid from said motor, means for effecting operation of said displacement varying means in response to variations in the pressure of the liquid discharged by said motor, a power source, a differential having one leg thereof driven from said motor and a second leg thereof driven from said power source whereby the third leg of said differential rotates in response to the speed of said motor varying relative to the speed of said second leg, means responsive to rotation of said third leg for adjusting said choke, and means for regulating the speed of said second leg.

12. A hydraulic transmission, comprising a pump having means for varying its displacement and having means responsive to pump pressure reaching a given maximum for reducing its displacement until it is delivering just enough liquid to maintain that pressure substantially constant, a motor energized by liquid delivered thereto by said pump, means for controlling the speed of said motor, and means for effecting operation of said displacement varying means in response to variations in the pressure of the liquid discharged by said motor, said speed control means including a main choke, a channel connecting the outlet of said motor to the inlet of said choke, means for adjusting said choke in response to motor speed varying from a given speed, and a second choke connected in parallel with said main choke and adjustable in response to variations in the pressure of the liquid discharged by said motor relative to the pressure of the liquid delivered to said motor to thereby compensate for variations in the slip of said motor due to variations in motor load.

13. A hydraulic transmission, comprising a motor for driving a load, means for supplying motive liquid to said motor to energize the same, and means for controlling the speed of said motor including means for throttling the outflow from said motor, a constant pressure outlet valve connected between said throttling means and said motor, and means responsive to variations in the drop in pressure across said motor for adjusting said throttling means to thereby compensate for variations in the slip of said motor.

14. A hydraulic transmission, comprising a motor for driving a load, means for supplying motive liquid to said motor to energize the same, and means for controlling the speed of said motor including a throttle valve for resisting the discharge of liquid from said motor, a choke connected in parallel with said throttle valve for bypassing liquid around said valve at a rate substantially equal to the slip of said motor, a constant pressure valve for limiting the pressure at the inlets of said throttle valve and said choke to a substantially constant low value, and means responsive to variations in the drop in pressure across said motor for adjusting said choke to thereby compensate for variations in the slip of said motor.

15. A hydraulic transmission, comprising a motor for driving a load, means for supplying motive liquid to said motor to energize the same and means for controlling the speed of said motor including a throttle valve, a slip compensator, a channel connecting the outlet of said motor to said throttle valve and to said slip compensator so that all of the liquid discharged from said motor flows therethrough, and a constant pressure valve arranged in said channel and adapted to maintain the pressure at the inlets of said throttle valve and said slip compensator substantially constant after said pressure has reached a given low value, said throttle valve and said clip compensator being so proportioned that the liquid which flows through said throttle valve is substantially equal to the liquid used by said motor in driving its load and the liquid which flows through said slip compensator is substantially equal to the slip of said motor, said slip compensator having means responsive to variations in the drop in pressure across said motor for adjusting said slip compensator to thereby compensate for variations in motor slip.

16. A hydraulic transmission, comprising a motor for driving a load, means for supplying motive liquid to said motor to energize the same, and means for controlling the speed of said motor including means for throttling the outflow from said motor, a constant pressure outlet valve connected between said throttling means and said motor, means responsive to variations in the drop in pressure across said motor for adjusting said throttling means to thereby compensate for variations in the slip of said motor, and means for adjusting said throttling means in response to the speed of said motor varying from a reference speed.

17. A hydraulic transmission, comprising a motor for driving a load, a pump for supplying motive liquid to said motor to energize the same, means for controlling the speed of said motor including a choke for throttling the outflow from said motor and a constant pressure valve for maintaining the pressure at the inlet of said choke substantially constant, said speed control means maintaining a back pressure on said motor, and a pump control responsive to said back pressure and to the pressure created by said pump for adjusting the displacement of said pump.

18. A hydraulic transmission, comprising a motor for driving a load, a pump for supplying motive liquid to said motor to energize the same, and means for controlling the speed of said motor including a choke for throttling the outflow from said motor, a constant pressure valve for maintaining the pressure at the inlet of said choke substantially constant, and a slip compensator for by-passing around said choke a part of the liquid discharged by said motor and having means responsive to variations in the drop in pressure across said motor for varying the rate at which said liquid is by-passed.

19. A hydraulic transmission, comprising a motor for driving a load, a pump for supplying liquid to said motor to energize the same, and means for controlling the speed of said motor including a throttle valve for throttling the outflow from said motor, a channel connecting the inlet of said valve to the outlet of said motor, a slip compensator having its inlet connected to said channel and being adapted to by-pass around said valve a small part of the liquid discharged by said motor, and a constant pressure valve arranged in said channel to maintain a substantially constant pressure at the inlets of said slip compensator and said valve, said slip compensator including means responsive to variations in the pressure at the inlet of said motor and means responsive to variations in the pressure at the outlet of said motor for varying the rate at which liquid can flow through said slip compensator.

WALTER FERRIS.

REFERENCES CITED

The following references are of record in the file of this patent:

UNITED STATES PATENTS

| Number | Name | Date |
|---|---|---|
| 1,908,534 | Parsons | May 9, 1933 |
| 2,004,522 | Douglas | June 11, 1935 |
| 2,005,731 | Ernst et al. | June 25, 1935 |
| 2,032,430 | Muller | Mar. 3, 1936 |
| 2,214,552 | Ferris | Sept. 10, 1940 |
| 2,312,213 | Ferris | Feb. 23, 1943 |
| 2,331,218 | Montelius | Oct. 5, 1943 |
| 2,480,403 | Ferris | Aug. 30, 1949 |